United States Patent
Wu et al.

(10) Patent No.: US 7,805,211 B2
(45) Date of Patent: Sep. 28, 2010

(54) SYSTEM AND METHOD FOR CORRECTING QUALITY PROBLEMS

(75) Inventors: ShunXiong Wu, Shenzhen (CN); Yong Ming Hao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1513 days.

(21) Appl. No.: 10/940,127

(22) Filed: Sep. 13, 2004

(65) Prior Publication Data

US 2005/0060057 A1    Mar. 17, 2005

(30) Foreign Application Priority Data

Sep. 12, 2003    (TW) .............................. 92125270 A

(51) Int. Cl.
G06F 19/00    (2006.01)
(52) U.S. Cl. ........................... 700/109; 702/84; 702/184
(58) Field of Classification Search ................ 700/108, 700/109, 110; 702/81–84, 182–185; 707/1, 707/3, 10, 100, 102, 200
See application file for complete search history.

(56) References Cited

U.S. PATENT DOCUMENTS

| | | | |
|---|---|---|---|
| 5,245,554 A | 9/1993 | Tsuyama et al. | |
| 6,463,441 B1 * | 10/2002 | Paradies | 707/102 |
| 6,539,271 B2 * | 3/2003 | Lech et al. | 700/109 |
| 6,735,597 B1 * | 5/2004 | Paradies | 707/102 |
| 7,127,409 B2 * | 10/2006 | Denning et al. | 702/81 |
| 2002/0123915 A1 * | 9/2002 | Denning et al. | 705/7 |

FOREIGN PATENT DOCUMENTS

| | | |
|---|---|---|
| TW | 510100 | 11/2002 |
| TW | 552541 | 9/2003 |

* cited by examiner

*Primary Examiner*—Charles R Kasenge
(74) *Attorney, Agent, or Firm*—Wei Te Chung

(57) ABSTRACT

A system for correcting quality problems includes a server (1), a database (2), and a plurality of client terminals (4) connected to the server through a network (3). The database stores data used or generated in utilizing the system. Each client terminal provides an interactive user interface for quality control operators to perform corrective actions. The server comprises: a data receiving module (12) for receiving confirmations and responses from the client terminals through the network; a data transmitting module (13) for transmitting initial corrective action reports generated by the server to corresponding client terminals, for operators located at the client terminals to reply to the initial corrective action reports; and a CAR (corrective action report) generating module (14) for integrating all data received by the data receiving module and automatically generating formal corrective action reports. A related method for correcting quality problems is also disclosed.

4 Claims, 3 Drawing Sheets

SYSTEM AND METHOD FOR CORRECTING QUALITY PROBLEMS

BACKGROUND OF THE INVENTION

1. Field of the Invention

The present invention relates to quality control systems and methods, and especially to a computerized quality control system and method capable of correcting quality problems by employing electronic communications.

2. Description of Related Art

Because competition can become highly intense in today's globalized economic society, product quality has become one of the most important factors relied on by manufacturing enterprises in maintaining and increasing market share. It is widely accepted that quality control should be carried out at all stages in a supply chain, from purchasing of raw materials to manufacturing and distributing of finished products. In order to achieve complete control of quality problems, both preventive actions and corrective actions are usually needed. Based on an understanding of a product or process, preventive actions address inadequate factors that may produce nonconformance. Corrective actions are aimed at eliminating the root causes of detected nonconformance, in order to prevent recurrences.

An example of the art of performing corrective actions in automated quality control is disclosed in U.S. Pat. No. 5,245,554 issued on Sep. 14, 1993 and entitled Integrated Quality Control Method and System. The patent discloses a method and system for explaining causes of failure of a product. An integrated quality control method is provided for determining causes of failure of a product, the method comprising the steps of: collecting information relating to failure of the product and measures taken to correct the failure; collecting information relating to manufacture and distribution of the product; combining the information relating to the failure and measures taken to correct the failure with the information relating to the manufacture and distribution of the product; and analyzing the combined information to determine causes of the failure of the product and predict possible future failures.

One disadvantage of the above-described method and system is that little consideration is given to the efficiency of data flow in the system and the cooperation of operators participating in the corrective actions. This can result in inefficiencies in quality control. Generally, corrective actions involve various professional teams and individuals such as product quality engineers, failure analysis engineers, and quality assurance managers. Each team or individual performs designated corrective action tasks. In addition, correcting quality problems is often a difficult process, and comprises procedures including describing quality problems, analyzing failure causes, performing corrective actions and confirming results of corrective actions. For efficiency, it is vital to utilize an electronic network to timely transmit data on corrective actions to corresponding operators involved, and to timely receive confirmations and responses from the operators. Therefore, what is needed is a computerized quality control system and method which can correct quality problems efficiently by employing electronic communications.

SUMMARY OF THE INVENTION

A main objective of the present invention is to provide a system and method for efficiently correcting quality problems by employing electronic communications.

To achieve the above objective, a system for correcting quality problems in accordance with a preferred embodiment of the present invention comprises a server, a database connected to the server through database connectivity, and a plurality of client terminals connected to the server through a network. The database stores data used or generated in utilizing the system. Such data comprise corrective action reports and confirmations and responses from the client terminals. Each client terminal provides an interactive user interface for quality control operators to perform corrective actions. The server comprises: a basic data maintenance module provided for maintaining data stored in the database; a data receiving module for receiving the confirmations and responses from the client terminals through the network; a data transmitting module for transmitting initial corrective action reports generated by the server to corresponding client terminals, for operators located at the client terminals to reply to the initial corrective action reports; a CAR (corrective action report) generating module for integrating all data received by the data receiving module and automatically generating formal corrective action reports; and a CAR search module for searching initial corrective action reports and formal corrective action reports stored in the database.

Further, the present invention provides a preferred method for correcting quality problems. The method comprises the steps of: receiving a quality problem description, and generating an initial corrective action report; receiving confirmation of the quality problem description; receiving root cause analysis and improvement suggestions; receiving results of corrective actions; receiving approval of the initial corrective action report; and generating a formal corrective action report.

Other objects, advantages and novel features of the present invention will be drawn from the following detailed description of a preferred embodiment and preferred method of the present invention with the attached drawings, in which:

DETAILED DESCRIPTION OF THE INVENTION

Figure 1:
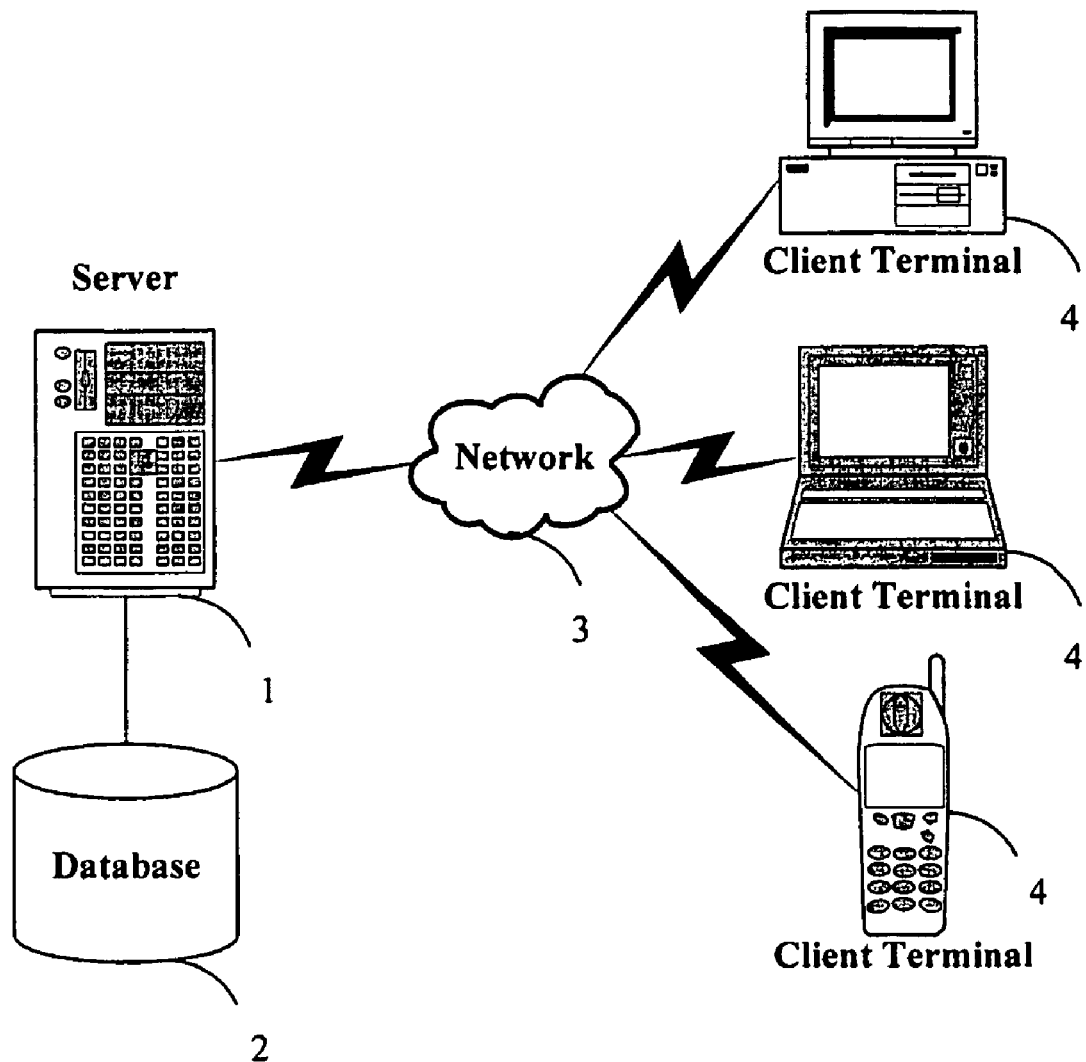
FIG. 1 is a schematic diagram of hardware configuration of a system for correcting quality problems in accordance with a preferred embodiment of the present invention.

FIG. 1 is a schematic diagram of hardware configuration of a system for correcting quality problems in accordance with the preferred embodiment of the present invention. The system comprises a server 1, a database 2 connected to the server 1 through database connectivity (not labeled), and a plurality of client terminals 4 linked to the server 1 via a network 3. The server 1 executes various application software for maintaining data stored in the database 2, for receiving and transmitting information on corrective actions, and for automatically generating corrective action reports (CARs). The database 2 stores data used or generated in utilizing the system. Such data comprise corrective action reports and various confirmations and responses from the client terminals 4. The confirmations and responses include confirmation of problem descriptions, root cause analysis and improvement suggestions, results of corrective actions, confirmation of corrective action results, and approval of initial corrective action reports. Each client terminal 4 provides an interactive user interface for quality control operators to perform corrective actions. The client terminals 4 may comprise general-purpose computer devices such as personal computers, laptops and portable handheld devices, and mobile phones and other suitable communication terminals. The quality control operators comprise professional teams or individuals participating in corrective actions. Such persons may include engineers in a product quality engineering (PQE) department, a failure analysis (FA) response department, a corrective action (CA) response department and a quality control (QC) department, and quality assurance (QA) managers. The network 3 may be an intranet, the Internet or any other suitable electronic communications network.

Figure 2:
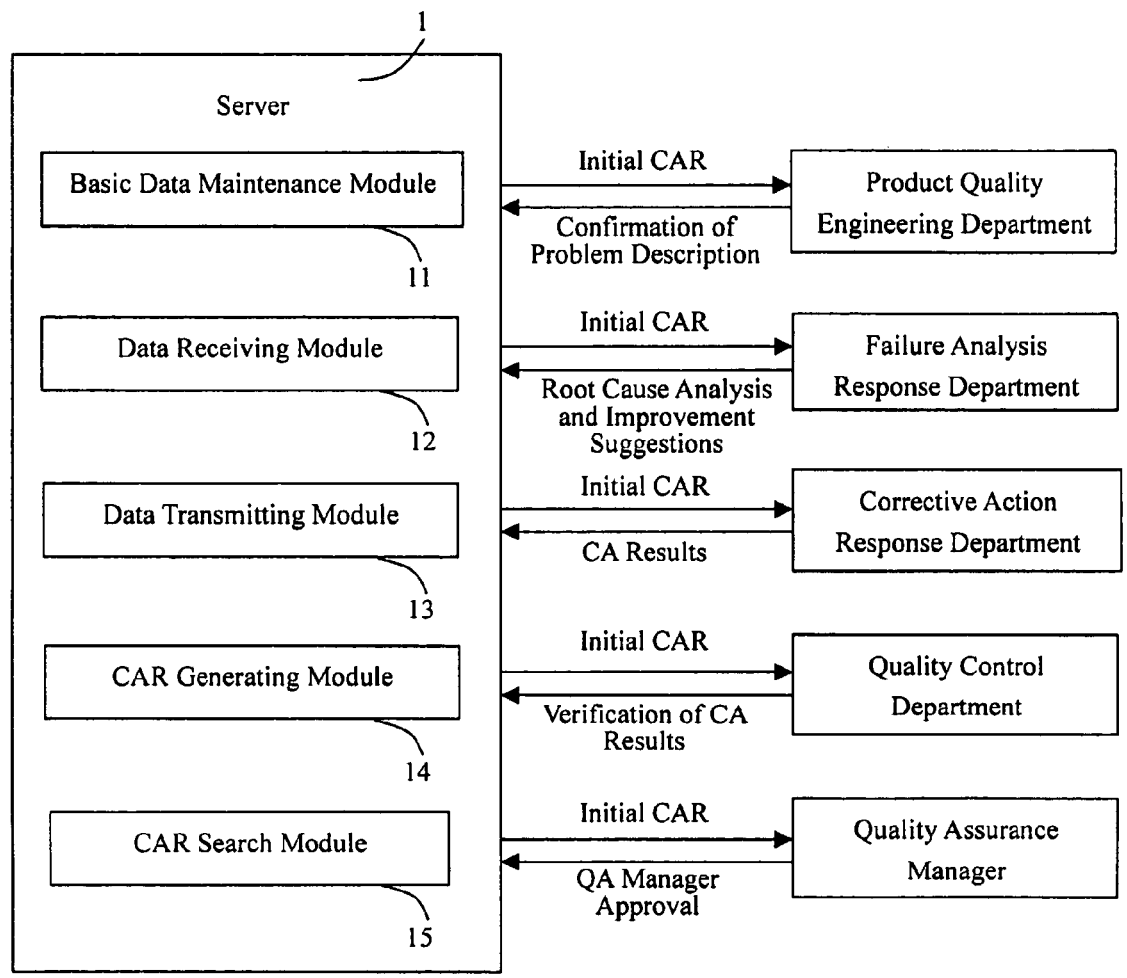
FIG. 2 is a schematic diagram showing main function modules of a server of FIG. 1 and data flow in the system.

FIG. 2 shows main function modules of the server 1 and data flow in the system. The server 1 comprises a basic data maintenance module 11, a data receiving module 12, a data transmitting module 13, a CAR (corrective action report) generating module 14, and a CAR search module 15. The basic data maintenance module 11 is provided for maintaining data stored in the database 2. Such data can be obtained by the data receiving module 12 from the client terminals 4 via the network 3. The data transmitting module 13 is provided for forwarding initial corrective action reports generated by the server 1 to corresponding client terminals 4, whereupon operators located at the client terminals 4 can reply to the initial corrective action reports. The database 2 stores basic information on all operators in the system. Each operator is granted a corresponding authority to use the system. During the performance of corrective actions, the data transmitting module 13 can automatically transmit relevant initial corrective action reports to an operator who has the appropriate authority needed for a current procedure. When an initial corrective action report is approved by a quality assurance manager, the CAR generating module 14 automatically generates a formal corrective action report, and stores the formal corrective action report in the database 2. The initial corrective action reports and formal corrective action reports can be inquired of via the CAR search module 15 when necessary.

Data in the system are mainly interchanged between the server 1 and the client terminals 4. Operators located at the client terminals 4 comprise professional engineers in a product quality engineering department, a failure analysis response department, a corrective action response department and a quality control department, and quality assurance managers. The server 1 generates an initial corrective action report according to a quality problem description provided by the quality control department, and transmits the initial corrective action report to the product quality engineering department. The problem description in the report is confirmed by engineers in this department. The server 1 receives confirmation results through the network 3. The server 1 then transmits the initial corrective action report including the confirmation results to the failure analysis response department. Engineers of the failure analysis response department analyze root causes of the quality problems, and provide improvement suggestions according to the root cause analysis. The server 1 receives the root cause analysis and improvement suggestions, and transmits the initial corrective action report including the root cause analysis and improvement suggestions to the corrective action response department. Corrective actions are performed by engineers of this department according to the improvement suggestions. The server 1 receives results of corrective actions, and transmits the initial corrective action report including the results of corrective actions to the quality control department. In this department, quality control engineers verify that the quality problems have been properly resolved by the corrective actions. The server 1 receives verification results, and transmits the initial corrective action report including all the above-described data to a relevant quality assurance manager for approval. The server 1 receives approval by the quality assurance manager.

Figure 3:
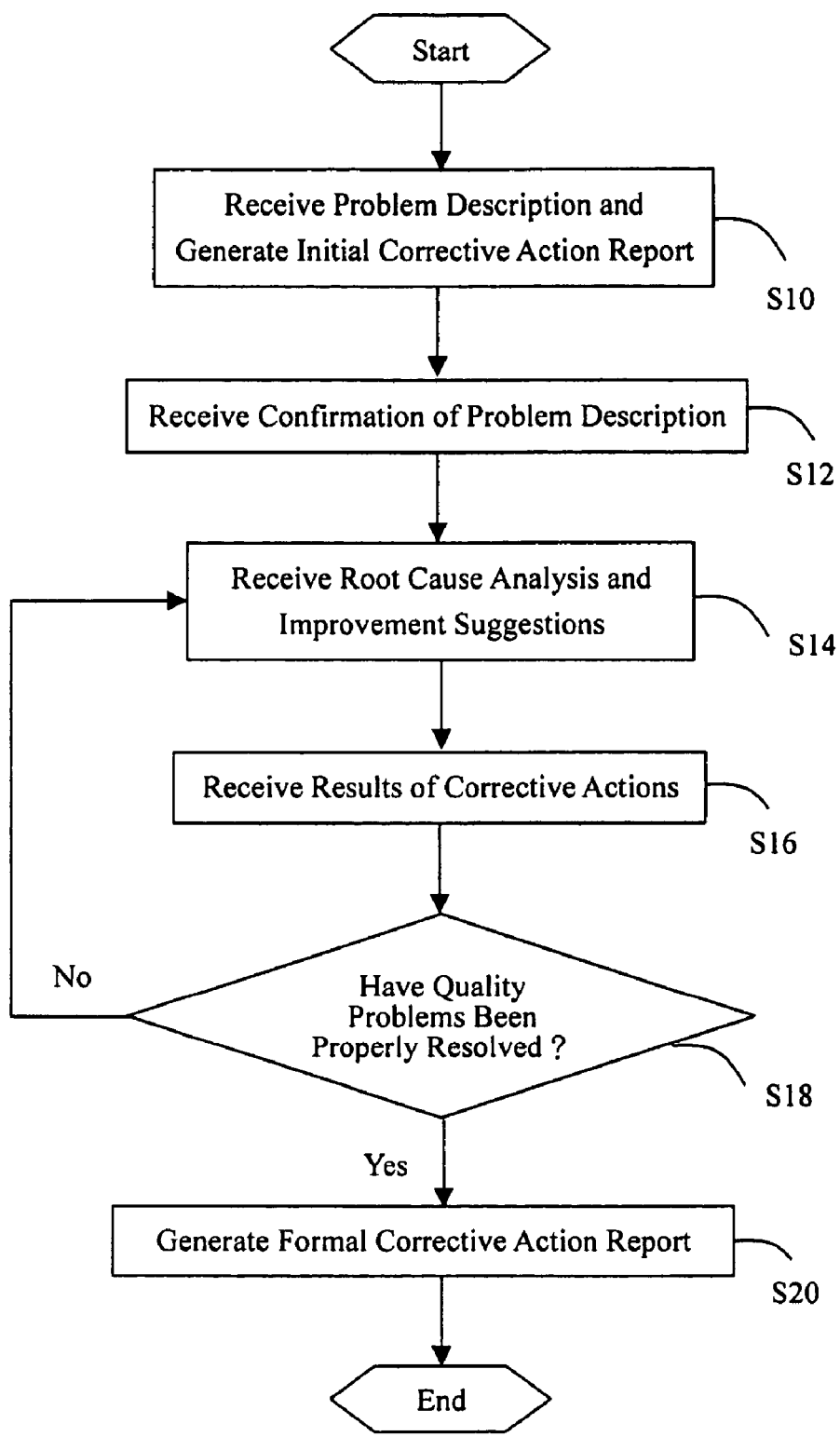
FIG. 3 is a flowchart of a preferred method for correcting quality problems in accordance with the present invention.

FIG. 3 is a flowchart of a preferred method for correcting quality problems in accordance with the present invention. When quality problems occur, engineers in a quality control department give a general description of the quality problems. The quality problems may include cases of product defects, equipment malfunction, and bad manufacturing processes. In step S10, a problem description is transmitted to the server 1. An initial corrective action report is then generated by the server 1 according to the problem description. The initial corrective action report comprises columns including CAR Type, CAR Number, Problem Description, Root Cause Analysis and Improvement Suggestions, QC Verification, and QA Manager Approval. Some columns, such as Root Cause Analysis and Improvement Suggestions, QC Verification and QA Manager Approval, are vacant at this stage.

In step S12, the data transmitting module 13 forwards the initial corrective action report to the client terminals 4 operated by a product quality engineering department, for engineers in the department to review and confirm the quality problems. Then a confirmation of the problem description is received by the data receiving module 12. In step S14, the data transmitting module 13 forwards the initial corrective action report including confirmation of the problem description to the client terminals 4 operated by a failure analysis response department, for engineers in that department to analyze root causes of the quality problems, and to provide corresponding improvement suggestions according to the root causes. Then the root cause analysis and improvement suggestions are received by the data receiving module 12. In step S16, the data transmitting module 13 forwards the initial corrective action report including the root cause analysis and improvement suggestions to the client terminals 4 operated by a corrective action response department, for engineers in that department to perform corrective actions according to the root cause analysis and improvement suggestions. Then results of the corrective actions is are received by the data receiving module 12. In step S18, the data transmitting module 13 transmits the initial corrective action report including the results of the corrective actions to the client terminals operated by the quality control department, for quality control engineers to determine whether the quality problems have been properly resolved by the corrective actions.

If the quality problems have not be properly resolved by the corrective actions, the procedure returns to step S14 described above. The engineers of the failure analysis response department further analyze the quality problems. These engineers determine why the previous improvement suggestions were insufficient, and what new improvements are needed to solve the quality problems. If the quality problems have been properly resolved by the corrective actions, in step S20, the data receiving module 12 receives verification from the quality control department. The data transmitting module 13 forwards the initial corrective action report including all the above-described data to a quality assurance manager. The quality assurance manager reviews the entire corrective action report, and approves the report if he/she is satisfied that adequate corrective actions have been taken. The server 1 receives the approval of the quality assurance manager, and the CAR generating module 14 automatically generates a formal corrective action report accordingly.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for correcting quality problems, the system comprising a server, a database, and a plurality of client terminals connected to the server through a network, wherein:

the database stores data used or generated in utilizing the system, such data comprising corrective action reports and confirmations and responses from the client terminals;

each of the client terminals provides an interactive user interface for a quality control operator to perform corrective actions; and the server comprises:

a data receiving module for receiving the confirmations and responses from the client terminals through the network;

a data transmitting module for transmitting initial corrective action reports generated by the server to corresponding client terminals, for operators located at the client terminals to reply to the initial corrective action reports; and a CAR (corrective action report) generating module for integrating all data received by the data receiving module and automatically generating formal corrective action reports.

2. The system according to claim 1, wherein the server further comprises a basic data maintenance module provided for maintaining data stored in the database.

3. The system according to claim 1, wherein the server further comprises a CAR search module, for searching initial corrective action reports and the formal corrective action reports stored in the database.

4. The system according to claim 1, wherein the confirmations and responses comprise confirmation of problem descriptions, root cause analysis and improvement suggestions, results of corrective actions, confirmation of corrective action results, and approval of initial corrective action reports.

* * * * *